United States Patent
Shaw et al.

(10) Patent No.: US 10,723,177 B2
(45) Date of Patent: Jul. 28, 2020

(54) REDUCED WEIGHT AIRCRAFT TIRE

(71) Applicant: THE GOODYEAR TIRE & RUBBER COMPANY, Akron, OH (US)

(72) Inventors: Joanne Elizabeth Shaw, Cuyahoga Falls, OH (US); Frank Anthony Kmiecik, Akron, OH (US); Leonard James Reiter, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 214 days.

(21) Appl. No.: 15/198,257

(22) Filed: Jun. 30, 2016

(65) Prior Publication Data
US 2017/0057292 A1    Mar. 2, 2017

Related U.S. Application Data

(60) Provisional application No. 62/212,105, filed on Aug. 31, 2015.

(51) Int. Cl.
*B60C 9/26* (2006.01)
*B60C 9/20* (2006.01)

(52) U.S. Cl.
CPC ........ *B60C 9/263* (2013.01); *B60C 2009/208* (2013.01); *B60C 2009/2016* (2013.01); *B60C 2009/2029* (2013.01); *B60C 2009/266* (2013.01); *B60C 2200/02* (2013.01)

(58) Field of Classification Search
CPC ................................ B60C 9/20; B60C 9/0042
See application file for complete search history.

(56) References Cited

U.S. PATENT DOCUMENTS

| | | | |
|---|---|---|---|
| 4,155,394 A | 5/1979 | Shepherd et al. | |
| 4,893,665 A | 1/1990 | Reuter et al. | |
| 5,109,906 A | 5/1992 | Giancola | |
| 5,280,083 A | 1/1994 | Forste | |
| 5,318,643 A | 6/1994 | Mizner | |
| 5,427,167 A | 6/1995 | Watanabe et al. | |

(Continued)

FOREIGN PATENT DOCUMENTS

| | | |
|---|---|---|
| CN | 101172450 A | 5/2008 |
| CN | 101535062 A | 9/2009 |

(Continued)

OTHER PUBLICATIONS

French Search Report dated Dec. 8, 2017 for Application Serial No. FR842336.

(Continued)

*Primary Examiner* — Jacob T Minskey
*Assistant Examiner* — Melody Tsui
(74) *Attorney, Agent, or Firm* — June E. Rickey

(57) ABSTRACT

A pneumatic tire having a carcass and a belt reinforcing structure, the belt reinforcing structure comprising: a zigzag belt reinforcing structure formed of a strip of one or more reinforcement cords, the strip of one or more reinforcement cords being inclined at 5 to 30 degrees relative to the centerplane of the tire extending in alternation to turnaround points at each lateral edge, wherein the zigzag strip of cords is formed from two different reinforcement cords made of different materials, and a low angle belt of the tire has a higher EPI than the zigzag belt.

3 Claims, 4 Drawing Sheets

(56) References Cited

U.S. PATENT DOCUMENTS

| | | | |
|---|---|---|---|
| 5,513,685 A | 5/1996 | Watanabe | |
| 5,558,144 A | 9/1996 | Nakayasu | |
| 6,571,847 B1 | 6/2003 | Ueyoko | |
| 6,634,398 B1 * | 10/2003 | Malin | B60C 9/2009 |
| | | | 152/526 |
| 6,799,618 B2 * | 10/2004 | Reuter | B60C 9/2204 |
| | | | 152/526 |
| 7,299,843 B2 | 11/2007 | Osborne et al. | |
| 7,360,571 B2 | 4/2008 | Ueyoko et al. | |
| 8,479,793 B2 | 7/2013 | Yoshikawa | |
| 9,168,788 B2 | 10/2015 | Ichihara | |
| 9,346,321 B2 | 5/2016 | Kiyoshi | |
| 9,604,501 B2 | 3/2017 | Tanaka | |
| 2002/0174927 A1 | 11/2002 | Armellin | |
| 2008/0105352 A1 | 5/2008 | Ueyoko | |
| 2010/0065180 A1 | 3/2010 | Ishiyama | |
| 2010/0154961 A1 | 6/2010 | Georges | |
| 2010/0154963 A1 | 6/2010 | Georges | |
| 2010/0243122 A1 | 9/2010 | Domingo | |
| 2011/0214793 A1 | 9/2011 | Ruffenach | |
| 2011/0303336 A1 * | 12/2011 | Ueyoko | B60C 9/263 |
| | | | 152/526 |
| 2012/0085475 A1 | 4/2012 | Lechtenboehmer | |
| 2012/0125509 A1 | 5/2012 | Georges | |
| 2012/0146199 A1 | 6/2012 | McMillan | |
| 2012/0312442 A1 | 12/2012 | Ueyoko | |
| 2015/0041039 A1 | 2/2015 | Dubos | |
| 2015/0239301 A1 | 8/2015 | Vallet | |
| 2015/0246580 A1 | 9/2015 | Sevim | |
| 2016/0023516 A1 | 1/2016 | Shima | |
| 2016/0023517 A1 | 1/2016 | Kmiecik | |
| 2016/0288576 A1 | 10/2016 | Romero | |
| 2017/0057291 A1 | 3/2017 | Shaw | |

FOREIGN PATENT DOCUMENTS

| | | | |
|---|---|---|---|
| CN | 102275466 A | 12/2011 | |
| CN | 102442159 A | 5/2012 | |
| CN | 102548775 A | 7/2012 | |
| CN | 104044403 A | 9/2014 | |
| DE | 20004648 U1 | 9/2000 | |
| EP | 0338483 A2 | 4/1989 | |
| EP | 338483 A2 | 10/1989 | |
| EP | 0540303 A1 | 5/1993 | |
| EP | 855289 A1 | 7/1998 | |
| EP | 2123483 A1 | 11/2009 | |
| EP | 2123483 A1 * | 11/2009 | B60C 9/2009 |
| JP | H0872160 A | 3/1996 | |
| JP | 2004217127 A | 8/2004 | |
| JP | 2004338455 A | 12/2004 | |
| JP | 2008179325 A | 8/2008 | |
| JP | 2008290607 | 12/2008 | |
| JP | 2010208090 A | 9/2010 | |

OTHER PUBLICATIONS

U.S. Appl. No. 14/745,625, filed Jun. 22, 2015.
Chinese Search Report (not dated) for Application Serial No. 201610773946.0.
Great Britain Search Report dated Jan. 30, 2017 for Application Serial No. GB1614142.6.
Chinese Search Report dated Jul. 20, 2017 for Application Serial No. 201610773974.2.
U.S. Appl. No. 15/198,238, filed Jun. 30, 2016.
Chinese search report dated May 31, 2018 for Application Serial No. 2016107739742.

* cited by examiner

REDUCED WEIGHT AIRCRAFT TIRE

FIELD OF THE INVENTION

This invention relates to pneumatic tires having a carcass and a belt reinforcing structure, more particularly to high speed heavy load tires such as those used on aircraft.

BACKGROUND OF THE INVENTION

Pneumatic tires for high speed applications experience a high degree of flexure in the crown area of the tire as the tire enters and leaves the area of the footprint. This problem is particularly exacerbated on aircraft tires wherein the tires can reach speed of over 200 mph at takeoff and landing.

When a tire spins at very high speeds the crown area tends to grow in dimension due to the high angular accelerations and velocity, tending to pull the tread area radially outwardly. Counteracting these forces is the load of the vehicle which is only supported in the small area of the tire known as the footprint area.

Current tire design drivers are an aircraft tire capable of high speed, high load and with reduced weight. It is known in the prior art to use zigzag belt layers in aircraft tires, such as disclosed in the Watanabe U.S. Pat. No. 5,427,167. Zigzag belt layers have the advantage of eliminating cut belt edges at the outer lateral edge of the belt package. The inherent flexibility of the zigzag belt layers also help improve cornering forces. However, a tire designed with zigzag belt layers may result in too many layers at the belt edges which may reduce durability. Further, there is generally a tradeoff between load capacity and weight. Thus an improved aircraft tire is needed, which is capable of meeting high speed, high load and with reduced weight.

Definitions

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Modulus of elasticity" of a cord at a given strain or stress means the extension secant modulus calculated at the given strain or stress. A high elastic modulus means a secant elastic modulus over 1000 cN/tex and a low elastic modulus means a secant modulus under 600 cN/tex.

"Ply" means a continuous layer of rubber-coated parallel cords.

"Radial" and "radially" mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section width" is the distance between a tire's sidewalls measured at the widest part of the tire when inflated to rated pressure and not under load.

"Tangent modulus of elasticity" of a cord at a given strain or stress means the extension tangent modulus of the cord. At a given stress or strain, the tangent modulus of elasticity is the value of the slope of the tangent to the stress strain curve, and can be determined from ASTM E111-04, entitled "Standard Test Method for Young's Modulus, Tangent Modulus, and Chord Modulus."

"Zigzag belt reinforcing structure" means at least two layers of cords or a ribbon of parallel cords having 1 to 20 cords in each ribbon and laid up in an alternating pattern extending at an angle between 5° and 30° between lateral edges of the belt layers.

DETAILED DESCRIPTION OF THE INVENTION

Figure 1:
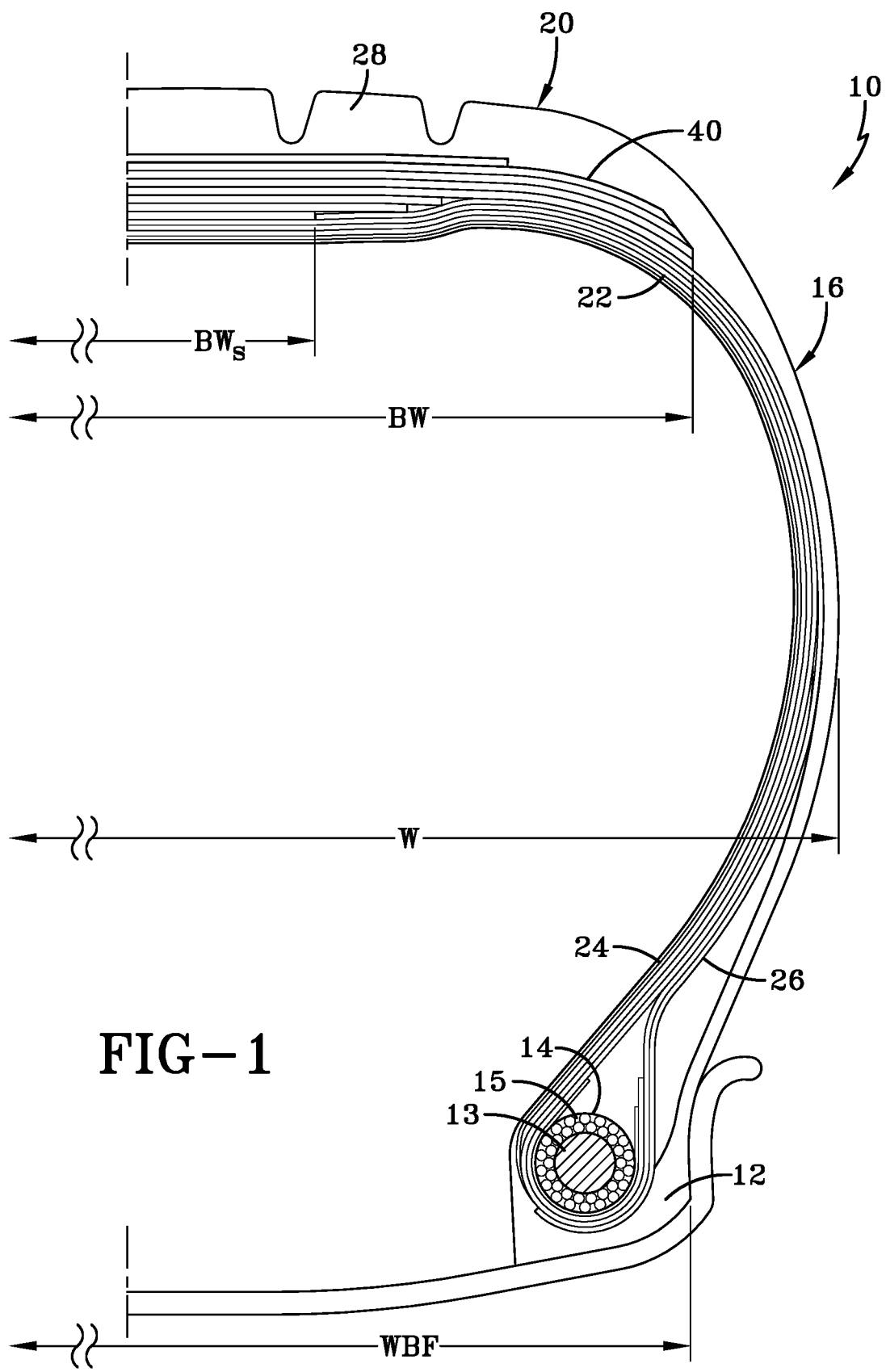
FIG. 1 is a schematic cross-sectional view of a first embodiment of half of a tire according to the invention.

FIG. 1 illustrates a cross-sectional view of one half of a radial aircraft tire 10 of the present invention. The tire is symmetrical about the mid-circumferential plane so that only one half is illustrated. As shown, the aircraft tire comprises a pair of bead portions 12 each containing a bead core 14 embedded therein. One example of a bead core suitable for use in an aircraft tire is shown in U.S. Pat. No. 6,571,847. The bead core 14 preferably has an aluminum, aluminum alloy or other light weight alloy in the center portion 13 surrounded by a plurality of steel sheath wires 15. A person skilled in the art may appreciate that other bead cores may also be utilized.

The aircraft tire further comprises a sidewall portion 16 extending substantially outward from each of the bead portions 12 in the radial direction of the tire, and a tread portion 20 extending between the radially outer ends of the sidewall portions 16. The tire is shown mounted on a rim flange having a rim flange width extending from one bead to the other bead and indicated as WBF in FIG. 1. The section width of the tire is indicated in FIG. 1 as W and is the cross-sectional width of the tire at the widest part when inflated to normal pressure and not under load.

Furthermore, the tire 10 is reinforced with a carcass 22 toroidally extending from one of the bead portions 12 to the other bead portion 12. The carcass 22 is comprised of inner carcass plies 24 and outer carcass plies 26, preferably oriented in the radial direction. Among these carcass plies, typically four inner plies 24 are wound around the bead core 14 from inside of the tire toward outside thereof to form turnup portions, while typically two outer plies 26 are extended downward to the bead core 14 along the outside of the turnup portion of the inner carcass ply 24.

The aircraft may preferably be an H type tire having a ratio of WBF/W in the range of about 0.65 to 0.7, and more preferably in the range of about 0.65 to about 0.68.

Each of these carcass plies 24, 26 may comprise any suitable cord, typically nylon cords such as nylon-6, 6 cords extending substantially perpendicular to an equatorial plane EP of the tire (i.e. extending in the radial direction of the tire). Preferably the nylon cords have an 1890 denier/2/2 or 1890 denier/3 construction. One or more of the carcass plies 24, 26 may also comprise an aramid and nylon cord structure, for example, a hybrid cord, a high energy cord or a merged cord. Examples of suitable cords are described in U.S. Pat. Nos. 4,893,665, 4,155,394 or 6,799,618. The ply cords may have a percent elongation at break greater than 8% and less than 30%, and more preferably greater than 9% and less than 28%.

Figure 3:
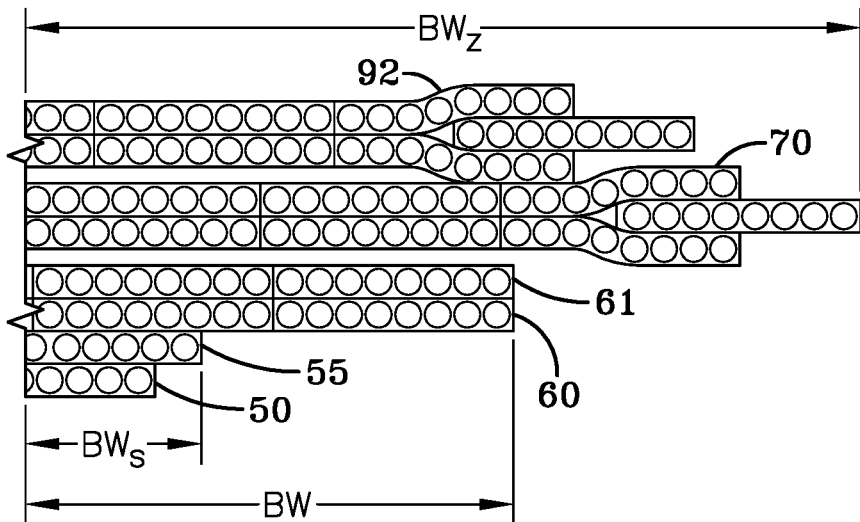
FIG. 3 is a schematically enlarged cross-sectional view of a first embodiment of half of a composite belt package for a tire showing the belt layer configuration.

The aircraft tire 10 further comprises a belt package 40 arranged between the carcass 22 and the tread rubber 28. FIG. 3 illustrates a first embodiment of one half of a belt package 40 suitable for use in the aircraft tire. The belt package 40 is symmetrical about the mid-circumferential plane so that only one half of the belt package is illustrated. The belt package 40 as shown comprises a first belt layer 50 located adjacent the carcass. The first belt layer 50 is preferably formed of reinforcement cords forming an angle of 10 degrees or less with respect to the mid-circumferential plane, and more preferably, 5 degrees or less. Preferably, the first belt layer 50 is formed of a first rubberized strip 41 of two or more cords made by spirally or helically winding the cords relative to the circumferential direction. The first belt layer 50 is the narrowest belt structure of the belt package 40, and has a width in the range of about 13% to about 100% of the rim width (width between flanges).

The belt package 40 further comprises a second belt layer 55 located radially outward of the first belt layer 50. The second belt layer 55 is preferably formed of cords having an angle of 10 degrees or less with respect to the mid-circumferential plane. Preferably, the second belt layer 55 is formed of a rubberized strip 41 of two or more cords made by spirally or helically winding the cords relative to the circumferential direction. The second belt layer has a width in the range of about 13% to about 100% of the rim width. Preferably the second belt layer 55 has a width the same or slightly greater than the first belt layer 50. The belt package 40 may further comprise a third belt layer 60 and a fourth belt layer 61. The third belt layer 60 is located radially outward of the second belt layer 55, and may be substantially wider than the second belt layer. The fourth belt layer is located radially outward of the third belt layer 60, and may be the same width as the third belt layer 60 or slightly wider. The third and fourth belt layers 60, 61 are low angle belts, typically with a belt angle of 10 degrees or less with respect to the mid-circumferential plane. Preferably, the third and fourth belt layers 60, 61 are formed of a first rubberized strip 41 of two or more cords made by spirally or helically winding the cords relative to the circumferential direction.

Figure 2:
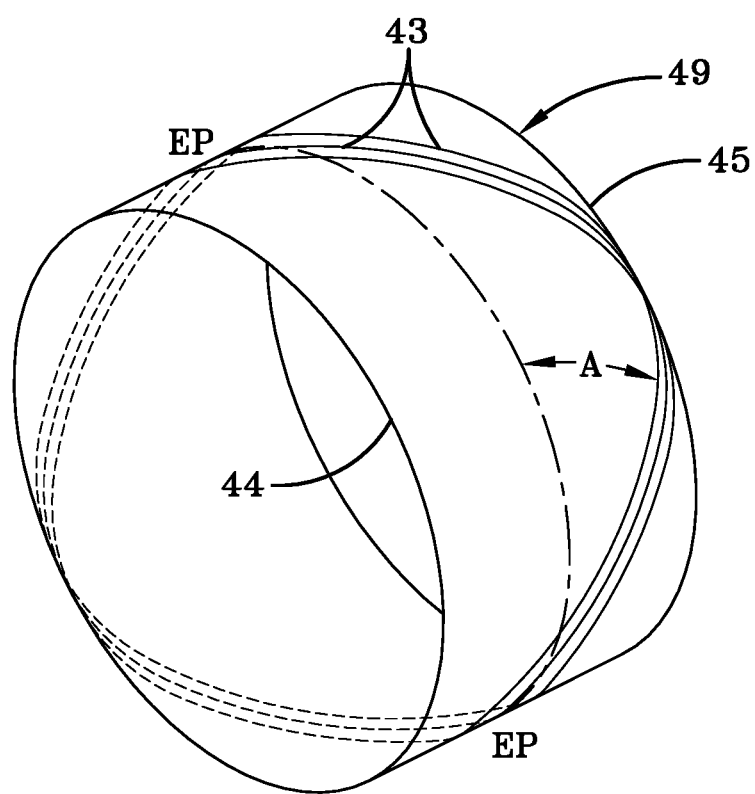
FIG. 2 is a schematic perspective view of a zigzag belt layer in the middle of the formation.
Figure 5:
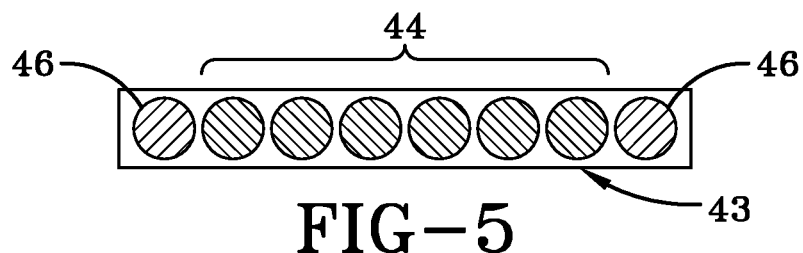
FIG. 5 is a first embodiment of a belt reinforcement strip.

The belt package 40 further comprises at least one zigzag belt reinforcing structure 70. The zigzag belt reinforcing structure 70 is comprised of two layers of cord interwoven together formed as shown in FIG. 2. The zigzag belt structure is formed from a rubberized composite strip 43 of two or more cords. The composite strip 43 is shown in FIG. 5 and described in more detail, below. The composite strip 43 is wound generally in the circumferential direction to extend between alternating lateral edges 44 and 45 of a tire building drum 49 or core. The strip is wound along such zigzag path many times while the strip 43 is shifted a desired amount in the circumferential direction so as not to form a gap between the adjoining strips 43. As a result, the cords extend in the circumferential direction while changing the bending direction at a turnaround point at both ends 44, 45. The cords of the zigzag belt structure cross with each other, typically at a cord angle A of 5 degrees to 30 degrees with respect to the equatorial plane EP of the tire when the strip 43 is reciprocated at least once between both side ends 44 and 45 of the ply within every 360 degrees of the circumference as mentioned above. The two layers of cords formed in each zigzag belt structure are embedded and inseparable in the belt layer and wherein there are no cut ends at the outer lateral ends of the belt.

In the embodiment of FIG. 3, it is preferred that one or more of the low angle belts 50, 55, 60, 61 are formed of a strip of reinforcement cords having an EPI of 18. It is preferred that the strip of reinforcement cords are formed of aramid, or a merged cord blend of aramid of nylon. It is additionally preferred that the strip have a width of 0.5 inches, with 9 reinforcement cords. The zigzag belt strips are preferably formed of a 0.5 inch composite strip of 8 reinforcement cords having an EPI of 16. It is additionally preferred that the zigzag belt strips have a gauge or thickness of 0.065 inches, and the low angle belts are formed of a strip having a thickness of 0.062 inches.

In order to reduce the number of overlapping strips at the belt edges, it is preferred that the amplitude or width of the zigzag belt winding be varied. Generally, a zigzag belt is formed to have a constant amplitude or width. In order to reduce the number of layers at the belt edges, the amplitude (distance from the drum center to the axial end of the drum) of the zigzag can be varied. The amplitude can be varied randomly, or it can be carried by a pattern. In one example, a first zigzag winding on the drum has a first winding pattern of W1W2, wherein W1 is a first amplitude, and W2 is a second amplitude which immediately follows the first amplitude, wherein W1 is not equal to W2. A second winding is overlayed on the first winding, and has a second winding pattern of W2W1. Each winding pattern is repeated as often as necessary to complete the winding on the drum.

Strip Configuration

The composite strip 43 is shown in FIG. 5, may be used to form any of the above described belt structures, and is preferably used to form at least one of the zigzag belt structures. More preferably, the composite strip is used to form all of the zigzag belt structures. The composite strip is made of two or more parallel reinforcement cords, wherein the reinforcement cords are different from each other. The reinforcement cords are embedded in rubber. More preferably, the composite strip 43 is formed of reinforcements made from different materials. The width of the strip may vary as desired, but it is preferably about 0.5 inches, with a variation of +/−5%. The gauge or thickness of the strip may vary depending upon the application. If the reinforced strip is utilized for spiral (helically wound) or low angle belts, then the gauge or thickness of the strip may be 0.062 inches. If the reinforced strip is used for zigzag belts, then the strip thickness is greater than for low angle/spiral belts. The strip thickness for zigzag belts is preferably 0.065 inches.

In a first embodiment shown in FIG. 5, the first cord reinforcement 44 has a higher tangent modulus than the second cord reinforcement 46. Preferably, the composite strip has at least two higher tangent modulus reinforcement cords 44 located laterally inward on the strip, and at least two lower tangent modulus reinforcement cords. Preferably, the lower tangent modulus reinforcement cords 46 are located on the lateral outer ends of the composite strip. The higher tangent modulus reinforcement cords 44 have a tangent modulus at 80% break greater than 4500 MPA, and more preferably greater than 10,000 MPA and less than 31,000 MPA. The lower tangent modulus cords 46 have a tangent modulus at 80% break of less than 4500 MPA.

In the example shown in FIG. 5, there are 8 total reinforcement cords arranged in parallel relationship to each other. The composite strip 43 has a 0.5 inch width. The composite strip 43 has an EPI (ends/inch) of 16. The composite strip 43 has a nylon reinforcement cords 46 located on each lateral edge of the strip. There could also be four outer reinforcement cords 46, with two reinforcement cords 46 located at each lateral edge. The lower modulus reinforcement cords 46 may be formed of any desired materials, such as nylon or nylon 6,6. It is preferred that the lower modulus cords 46 be Nylon having a 2100 denier/2/2 construction. The composite strip 43 as shown in FIG. 5 has six higher modulus reinforcement cords 44 located laterally inward of the lower modulus reinforcement cords 46. The inner reinforcement cords 44 may be formed of any higher modulus material such as aramid, POK or a merged or hybrid cord made of aramid and nylon. One example of a suitable cord construction may comprise a composite of aramid and nylon, containing two cords of a polyamide (aramid) with construction of 3300 dtex with a 6.7 twist, and one nylon or nylon 6/6 cord having a construction of 1860 dtex, with a 4.5 twist. The overall merged cable twist is 6.7. A second example of a suitable high modulus cord construction contains three cords of a polyamide with a construction of 1670 denier/1/3 construction.

Figure 6:
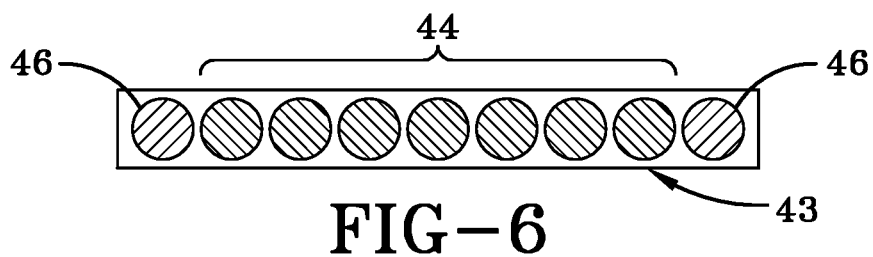
FIG. 6 is a second embodiment of a belt reinforcement strip.

FIG. 6 illustrates a second embodiment of a strip suitable for the invention. The composite strip 100 has a strip width of 0.5 inches, and nine reinforcement cords. The composite strip 100 has an epi (ends/inch) of 18. The laterally outer reinforcement cords 146 located at each lateral end of the strip are formed of a lower modulus material having a tangent modulus at 80% of break of less than 4500 MPA. Preferably, the outer reinforcement cords 146 are formed of nylon. The composite strip further includes higher modulus cords 144, which are preferably located between the lower modulus reinforcement cords 146.

Figure 4:
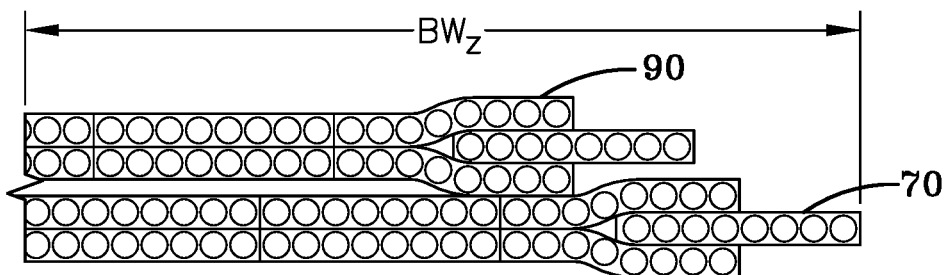
FIG. 4 is a schematically enlarged cross-sectional view of a second embodiment of a composite belt package showing the belt layer configuration.

FIG. 4 illustrates a second embodiment of the present invention. The second embodiment includes a first and second zigzag belt structure 80, 90. The second zigzag belt structure 90 is located radially outward of the first zigzag belt structure 80. The second zigzag belt structure 90 has a width less than the first zigzag belt structure 80.

Figure 7:
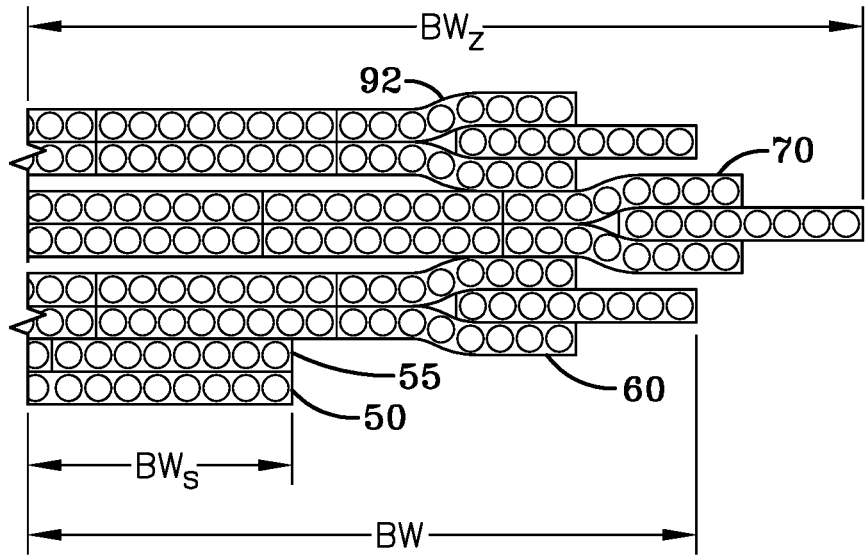
FIG. 7 is an alternate embodiment of a tire.
Figure 8:
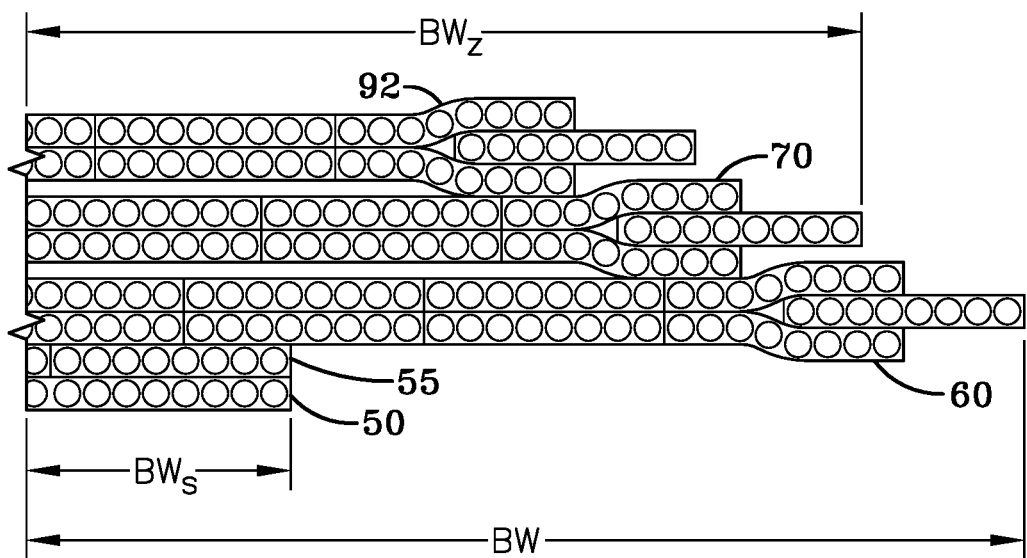
FIG. 8 is an alternate embodiment of a tire.

FIG. 7 illustrates a third embodiment of the present invention. The third embodiment includes a first, second and third zigzag belt structure 92, 70, 60. The third zigzag belt structure 60 is the radially innermost zigzag belt, and has an axial width less than the axial width of the second zigzag belt 70. The second zigzag belt 70 is the widest zigzag belt and the widest belt overall. Low angle belts 50, 55 are significantly narrower than the zigzag belts. FIG. 8 also shows that the zigzag belts may be arranged so that the radially outermost zigzag belt is the narrowest zigzag belt, and zigzag belt 70 is wider than belt 92. The radially innermost zigzag belt 60 is the widest zigzag belt and the widest belt overall. Preferably, the low angle belts 50, 55 are spirally wound using a first strip of reinforcement cords, wherein the first strip of reinforcement cord has an EPI of 18 and the reinforcement cords are a merged cord of aramid and nylon blend. The first strip has a thickness of 0.062 inch. The zigzag belt is formed of a second strip of reinforcement cords different than the first strip of reinforcement cords. Preferably, the second strip of reinforcement cords has an EPI less than the first strip, and is more preferably 16 EPI. The thickness of the second strip is 0.065 inches. It is preferred that the reinforcement cords at the laterally outer ends of the second strip is formed of nylon cords. It is preferred that the inner cords located between the nylon cords be formed of merged cord or blend of nylon and aramid or aramid.

It is additionally preferred that the ply cords have a greater elongation at break than the belt cords elongation at break. The cord properties such as percent elongation at break, linear density and tensile strength are determined from cord samples taken after being dipped but prior to vulcanization of the tire.

Variations of the present invention are possible in light of the description as provided herein. While certain representative embodiments and details have been shown for the purpose of illustrating the subject inventions, it will be apparent to those skilled in the art that various changes and modifications can be made without departing from the scope of the subject inventions.

What is claimed is:

1. A pneumatic tire having a carcass and a belt reinforcing structure, the belt reinforcing structure comprising:
    a low angle belt formed by winding a first strip of reinforcement cords, wherein the width of the first strip is about 0.5 inches;
    a zigzag belt reinforcing structure formed by winding a second strip of reinforcement cords, wherein the width of the second strip is about 0.5 inches, wherein the second strip of cords has a lower EPI (ends/inch) than the first strip of cords, wherein the first strip has a thickness of 0.062 inches.

2. A pneumatic tire having a carcass and a belt reinforcing structure, the belt reinforcing structure comprising:
    a low angle belt formed by winding a first strip of reinforcement cords, wherein the width of the first strip is about 0.5 inches;
    a zigzag belt reinforcing structure formed by winding a second strip of reinforcement cords, wherein the width of the second strip is about 0.5 inches, wherein the second strip of cords has a lower EPI (ends/inch) than the first strip of cords, wherein the second strip has a thickness of 0.065 inches.

3. A pneumatic tire having a carcass and a belt reinforcing structure, the belt reinforcing structure comprising:
    a low angle belt formed by winding a first strip of reinforcement cords, wherein the width of the first strip is about 0.5 inches;
    a zigzag belt reinforcing structure formed by winding a second strip of reinforcement cords, wherein the width of the second strip is about 0.5 inches, wherein the second strip of cords has a lower EPI (ends/inch) than the first strip of cords, wherein the first strip is formed of one or more reinforcement cords having a merged cord of 3000/2 Aramid and 1680/1 nylon construction.

* * * * *